US012755971B2

(12) United States Patent
Deng et al.

(10) Patent No.: US 12,755,971 B2
(45) Date of Patent: Oct. 6, 2026

(54) ANODE ACTIVE MATERIAL AND LITHIUM-ION BATTERY APPLYING THE SAME

(71) Applicant: EVE POWER CO., LTD., Jingmen (CN)

(72) Inventors: Xiaohan Deng, Jingmen (CN); Xiaokun Wang, Jingmen (CN); Hao Cheng, Jingmen (CN); Haitao Wei, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 499 days.

(21) Appl. No.: 18/241,915

(22) Filed: Sep. 4, 2023

(65) Prior Publication Data

US 2023/0411620 A1 Dec. 21, 2023

(30) Foreign Application Priority Data

Jul. 18, 2023 (CN) ......................... 202310878117.9

(51) Int. Cl.

*H01M 4/583* (2010.01)
*H01M 4/04* (2006.01)
*H01M 4/133* (2010.01)
*H01M 4/1393* (2010.01)
*H01M 10/0525* (2010.01)
*H01M 4/02* (2006.01)

(52) U.S. Cl.

CPC ......... *H01M 4/583* (2013.01); *H01M 4/0419* (2013.01); *H01M 4/0471* (2013.01); *H01M 4/133* (2013.01); *H01M 4/1393* (2013.01); *H01M 10/0525* (2013.01); *H01M 2004/021* (2013.01); *H01M 2004/027* (2013.01)

(58) Field of Classification Search

CPC .. H01M 4/583; H01M 4/0471; H01M 4/0419; H01M 4/133; H01M 4/1393; H01M 10/0525

See application file for complete search history.

(56) References Cited

U.S. PATENT DOCUMENTS

| | | | | |
|---|---|---|---|---|
| 2012/0171571 A1* | 7/2012 | Kurakane | H01M 4/1393 429/231.9 |
| 2017/0033360 A1* | 2/2017 | Michaud | H01M 10/0525 |
| 2020/0127288 A1* | 4/2020 | Lu | H01M 4/583 |

FOREIGN PATENT DOCUMENTS

| | | | | |
|---|---|---|---|---|
| CN | 109713237 A | | 5/2019 | |
| CN | 114792791 A | * | 7/2022 | H01M 10/0525 |
| CN | 115692645 A | | 2/2023 | |
| JP | 2015187934 A | | 10/2015 | |
| JP | 2016091998 A | | 5/2016 | |
| JP | 2016167352 A | | 9/2016 | |

OTHER PUBLICATIONS

Zhang Yuefeng et al., Experimental Research on Purification of Medium-carbon Graphite, Non-Metallic Mines, Sep. 2010, pp. 37-39, vol. 33, No. 5.

Notice of Allowance of counterpart Chinese Patent Application No. 202310878117.9 issued on Jun. 1, 2026.

* cited by examiner

*Primary Examiner* — Jonathan G Jelsma

(57) ABSTRACT

Provided in the present application is an anode active material, in which a preparation method of the anode active material includes steps as follows: in step 1, mixing graphite particles, sodium tetraborate and amorphous carbon, pulping with mixed particles prepared therefrom, thereby obtaining a mixed slurry, in which a feeding amount of materials mentioned above meets as follows: a mass of the graphite particles:a mass of the amorphous carbon=2~4:6~8, a mass of the sodium tetraborate:a mass of the graphite particles=0.07~0.12:1, and the graphite particles include synthetic graphite; in step 2, spray-drying the mixed slurry, and solid particles obtained therefrom are used as a precursor; and in step 3, heating the precursor for 18~34 hours at 2000~3000° C. so as to prepare and obtain the anode active material.

20 Claims, No Drawings

ANODE ACTIVE MATERIAL AND LITHIUM-ION BATTERY APPLYING THE SAME

CROSS-REFERENCE TO RELATED APPLICATIONS

The present application claims priority of Chinese Patent Application No. 202310878117.9 filed on Jul. 18, 2023, the contents of which are hereby incorporated by reference in their entirety.

FIELD

The present application relates to the technical field of batteries, in particular to an anode active material and a lithium-ion battery applying the same.

BACKGROUND

Anode materials have a large impact on the energy density, cycling performance, charge/discharge rate, and low-temperature discharge performance of batteries, and graphite is currently the relatively widely used anode active material in lithium-ion batteries. Graphite-based materials are mainly categorized into synthetic graphite and natural graphite, both of which are currently widely used anode materials for lithium-ion batteries. Compared with synthetic graphite, natural graphite provides the advantages of high theoretical capacity and low cost, but the disadvantage of natural graphite lies in the problems of large volume expansion rate, more defects on the surface of the material itself (high material anisotropy), which lead to a large number of side-reactions with the electrolyte to form too much SEI film, which triggers an irreversible loss of capacity and lithium precipitation, resulting in a large reduction in cycling performance and storage performance of natural graphite in lithium-ion batteries, which also leads to a potential hazard. However, synthetic modified graphite has become the best candidate for replacing natural graphite by making up for the shortage of high expansion rate and low cycling life of natural graphite with good stability and surface consistency of the material. However, current lithium-ion batteries applying synthetic graphite as an anode active material tend to have poor performance such as poor storage performance at a high temperature.

SUMMARY

In order to improve the storage performance at a high temperature of the lithium-ion battery applying synthetic graphite as an anode active material, provided in the present application is an anode active material and a lithium-ion battery applying the same.

According to a first aspect of the present application, provided in the present application is an anode active material, in which a preparation method of the anode active material includes steps as follows: in step 1, mixing graphite particles, sodium tetraborate and amorphous carbon, pulping with mixed particles prepared therefrom, thereby obtaining a mixed slurry, in which a feeding amount of materials mentioned above meets as follows: a mass of the graphite particles:a mass of the amorphous carbon=2~4:6~8, a mass of the sodium tetraborate: a mass of the graphite particles=0.07~0.12:1, and the graphite particles include synthetic graphite; in step 2, spray-drying the mixed slurry, and solid particles obtained therefrom are used as a precursor; and in step 3, heating the precursor for 18~34 hours at 2000~3000° C. so as to prepare and obtain the anode active material. The mass ratio of the graphite particles and the amorphous carbon feeding in step 1 may be, but is not limited to, such as 2:6, 2:8, 3:7, 4:6, and 4:8. Other values not listed in the range of the feeding amount of the materials are also applicable. The mass ratio of the sodium tetraborate and the graphite particles feeding in step 1 may be, but is not limited to, such as 0.07:1, 0.08:1, 0.1:1, 0.11:1, and 0.12:1. Other values not listed in the range of the feeding amount of the materials are also applicable. A heating temperature adopted in step 3 involving a heating process of the precursor may be, but is not limited to, such as 2000° C., 2200° C., 2500° C., 2800° C., and 3000° C. Other values not listed in the range of the heating temperature for heating the precursor are also applicable.

In the present application, spray-drying the amorphous carbon to form a coating layer on the surface of synthetic graphite. By designing the slurry formulation used in spray-drying and the subsequent heating process, a uniform and reliable coating layer is formed on the surface of graphite particles containing synthetic graphite. On the one hand, it may modify the surface of graphite particles homogeneously, change the structural properties of graphite surface, reduce the surface defects thereof, suppress the further increase of crystalline diameter, and shorten the conduction distance of lithium ions. On the other hand, the contact interface between the electrolyte and the graphite particles may be reduced by forming a gap, thereby reducing the possibility of side reactions occurring at the interface. The above two aspects collectively reduce the resistance and polarization of the anode active material containing synthetic graphite, avoiding the formation of excessive SEI film on the surface of the anode active material in the working process, thereby improving the capacity of the anode active material and reducing the irreversible loss of the capacity of the anode active material. Therefore, the anode active material provided in the present application provides good conductivity, cycling performance, and storage performance, especially the storage performance under high-temperature operating conditions. Additionally, in the process of preparing the anode active material of the present application, the prepared precursor includes sodium tetraborate and graphite particles. During the subsequent heating process of the precursor, sodium tetraborate may infiltrate into the graphite material and transform into high-temperature antioxidant substance, filling the internal gaps of the graphite material and covering the graphite surface, which may play a role in isolating oxidizing gases and blocking gases from entering into the interior of the graphite material from the gaps, slowing down the occurrence of oxidizing reaction, improving the high-temperature antioxidant performance of the graphite material, which improves the capacity retention rate of the anode active material, and improves the high-temperature working stability.

Preferably, in step 1, the mixed slurry is prepared by mixing the mixed particles with citric acid and slurry dispersant, and a feeding amount of the citric acid meets as follows, a mass of the citric acid:a mass of the mixed particles=0.02~0.05:1. A feeding amount of citric acid may be, but is not limited to, determined by a mass of citric acid:a mass of the mixed particles=0.02, 0.03, 0.035, 0.04 and 0.05 and so on. Other values not listed in the range of a mass ratio between citric acid and the mixed particles are also applicable. In the process of preparing the mixed slurry, by introducing citric acid, it may play an effective role in removing impurities from the mixed slurry, and may effectively further optimize the electron storage performance of the anode active material provided in the present application. In the pulping process, water may be used as the slurry dispersant mentioned above. In order to provide better dispersion uniformity of the prepared mixed slurry, in the process of preparing the mixed slurry, a homogenization process such as ball grinding may be used to disperse the mixed particles homogeneously, and then citric acid and slurry dispersant may be added thereto.

Preferably, in step 1, a diameter $D_{25}$ of the graphite particles is 1.5~3.5 μm, and a diameter $D_{25}$ of the amorphous carbon is ≤1 μm. Keeping the diameters of graphite particles and amorphous carbon in the above range is conducive to improving the uniformity of the coating of graphite particles by amorphous carbon, which is embodied in the further improvement of the comprehensive performance of the final prepared anode material. In practice, the diameters of graphite particles or amorphous carbon may be regulated by homogenization processes such as ball grinding.

Preferably, a diameter of the amorphous carbon $D_{25}$=0.25~0.75 μm. The diameter of the amorphous carbon $D_{25}$ may be, but is not limited to, such as 0.25 μm, 0.3 μm, 0.5 μm, 0.6 μm, 0.75 μm. Other values not listed in the range are also applicable.

Preferably, before preparing the mixed particles by utilizing the graphite particles, performing a high-temperature process on the graphite particles, the high-temperature process is performed at a processing temperature of 2000~3000° C. The processing temperature may be, but is not limited to, such as 2000° C., 2250° C., 2500° C., 2750° C., and 3000° C. Other values not listed in the range are also applicable. As a result, the graphite particles may be purified by high-temperature impurity removal with heating process, and metal impurities (such as iron and manganese) contained in the graphite particles may be removed by high-temperature vaporization, thereby leading to further optimization of the comprehensive performance of the anode material provided in the present application.

Preferably, preparation of the amorphous carbon includes steps as follows: a carbon source used to prepare the amorphous carbon is subjected to a pyrolysis deposition reaction to obtain the amorphous carbon; during the pyrolysis deposition reaction, a pyrolysis temperature is 1350~1700° C., and a pyrolysis pressure is 1 kPa~4 kPa. The pyrolysis temperature of the pyrolysis deposition reaction may be, but is not limited to, such as 1350° C., 1450° C., 1500° C., 1650° C., and 1700° C. Other values not listed in the range of the pyrolysis temperature are also applicable. The pyrolysis pressure of the pyrolysis deposition reaction may be, but is not limited to, such as 1 kPa, 1.5 kPa, 2 kPa, 3 kPa, 4 kPa. Other values not listed in the range of the pyrolysis pressure are also applicable.

Preferably, the carbon source includes diacetylene.

Preferably, a diameter of the anode active material falls within a range of 1~30 μm. The diameter of the anode active material may be, but is not limited to, such as 1 μm, 8 μm, 15 μm, 25 μm, 30 μm. Other values not listed in the range are also applicable.

Preferably, a diameter distribution of the anode active material satisfies: $D_{10}$=15~18 μm, $D_{50}$=20~25 μm, $D_{90}$=28~32 μm. $D_{10}$ of the anode active material may be such as 15 μm, 15.5 μm, 16 μm, 17 μm, and 18 μm. $D_{50}$ of the anode active material may be such as 20 μm, 21 μm, 22 μm, 23 μm, 24 μm, and 25 μM. $D_{90}$ of the anode active material may be such as 28 μm, 29 μm, 30 μm, 31 μm, and 32 μm. The $D_{10}$, $D_{50}$ and $D_{90}$ of the anode active material are not limited to the listed values, and other values not listed in the range are also applicable. When the diameter distribution of the anode active material meets the above characteristics, the cycling performance and storage performance of the anode active material may be further optimized effectively.

Preferably, a temperature of the spray-drying in step 2 is 120~240° C. The temperature of the spray-drying may be, but is not limited to, such as 120° C., 150° C., 180° C., 220° C., and 240° C. Other values not listed in the range are also applicable.

According to a second aspect of the present application, provided is a lithium-ion battery, the lithium-ion battery including a negative electrode, the negative electrode including the anode active material mentioned above. The lithium-ion battery provided in the present application provides both good cycling performance and good storage performance at a high temperature.

DETAILED DESCRIPTION OF THE PREFERRED EXAMPLES

For a better understanding of the solutions of the present application by those skilled in the art, the technical solutions in the examples of the present application are clearly and completely described below. Obviously, the examples described herein are only some of the examples of the present application but not all of them.

Example 1

1. Preparation of the Anode Active Material

The graphite particles adopted in the present example is synthetic graphite.

In the present example, Processing Group 1A, Processing Group 2A, Processing Group 3A, Processing Group 4A, Processing Group 5A, Contrast Group 1A, Contrast Group 2A, Contrast Group 3A and Contrast Group 4A are set up according to the different processes for preparing the anode active material, and a blank control group is set up with the graphite particles used for the preparation of the anode active material of each Processing Group and Contrast Group, and the graphite particles are directly used as the anode active material in the blank control group.

Processing Group 1A

The anode active material in the present Processing Group is prepared according to steps as follows:

Step 1: Preparation of Mixed Slurry Containing Graphite Particles and Amorphous Carbon Step 1.1: Diacetylene is used as a carbon source for preparing amorphous carbon, and a deposition furnace is utilized for preparing the amorphous carbon by placing a chromium block in the pyrolytic deposition reaction region of the deposition furnace, setting the deposition temperature in the furnace to 1500° C.±15° C., and the pressure of the deposition furnace to 3 kpa±0.05 kpa, so that diacetylene is input to the deposition furnace at a flow rate of 0.5m 3/min to undergo pyrolytic deposition in the deposition furnace. After the reaction is completed, the chromium block in the deposition furnace is removed and scraped from the surface to obtain amorphous carbon after the pyrolytic deposition reaction. The amorphous carbon obtained therefrom is mixed with deionized water according to a mass ratio of 1:1, and the mixture obtained therefrom is placed in a ball grinder for ball grinding with stirring and mixing, and the ball grinding time is 18 hours. After the ball grinding, the mixture is placed in an oven for drying, and amorphous carbon powder is obtained therefrom. The diameter distribution of the amorphous carbon obtained therefrom meets that $D_{25}$ is approximately 0.5 μm.

Step 1.2: The graphite particles are processed at a high temperature at 2500° C. in order to fully remove the metal impurities originally contained in the graphite particles through high-temperature vaporization.

Step 1.3: According to a mass of sodium tetraborate: a mass of graphite particles=0.1, adding sodium tetraborate to the graphite particles after Step 1.2, and stirring to fully mix them and disperse them uniformly. Then, the amorphous carbon prepared by Step 1.1 is added to the above mixture, and an amount of amorphous carbon is determined according to a mass of graphite particles:a mass of amorphous carbon=3:7. The mixed particles are obtained therefrom.

Step 1.4: According to a mass of citric acid:a mass of mixed particles=0.03, sodium citrate is added to the mixed particles obtained by Step 1.3, and then the deionized water, which is used as a slurry dispersant, is added therein. It is mixed homogeneously and dispersed sufficiently, thereby obtaining a mixed slurry containing graphite particles and amorphous carbon.

Step 2: The mixed slurry prepared in Step 1 is spray-dried at a temperature of 200° C. for 24 hours, and the solid particles obtained therefrom are used as the precursor, in which amorphous carbon is coated on the surface of the graphite particles. The precursor is further vacuum-dried, and then ground to a diameter distribution of the precursor that is concentrated in a range of 20~25 μm.

Step 3: The precursor obtained in Step 2 is heated at 2500° C. for 22 hours, thereby preparing the anode active material of the present processing group. A diameter distribution of the anode active material obtained consequently meets: $D_{10}$=16 μm, $D_{50}$=22.5 μm and $D_{90}$=30 μm.

Processing Group 2A

The present processing group carries out the preparation of the anode active material referring to the solution provided in Processing Group 1A, and the difference from Processing Group 1A is that: in Step 1.1 of the preparation of the anode active material in the present processing group, when preparing the mixed particles, the amount of amorphous carbon to be added is determined according to a mass of graphite particles:a mass of amorphous carbon=2:8, and the mixed particles are obtained consequently. Except for the above differences, the materials and process operations adopted in the present Processing Group are strictly the same as those in Processing Group 1A.

Processing Group 3A

The present processing group carries out the preparation of the anode active material referring to the solution provided in Processing Group 1A, and the difference from Processing Group 1A is that: in Step 1.1 of the preparation of the anode active material in the present processing group, when preparing the mixed particles, the amount of amorphous carbon to be added is determined according to a mass of graphite particles:a mass of amorphous carbon=4:6, and the mixed particles are obtained consequently. Except for the above differences, the materials and process operations adopted in the present Processing Group are strictly the same as those in Processing Group 1A.

Processing Group 4A

The present processing group carries out the preparation of the anode active material referring to the solution provided in Processing Group 1A, and the difference from Processing Group 1A is that: the present processing group adjusts the temperature for heating the precursor to 2000° C. in step 3 of the preparation of the anode active material. Except for the above differences, the materials and process operations adopted in the present Processing Group are strictly the same as those in Processing Group 1A.

Processing Group 5A

The present processing group carries out the preparation of the anode active material referring to the solution provided in Processing Group 1A, and the difference from Processing Group 1A is that: the present processing group adjusts the temperature for heating the precursor to 3000° C. in step 3 of the preparation of the anode active material. Except for the above differences, the materials and process operations adopted in the present Processing Group are strictly the same as those in Processing Group 1A.

Contrast Group 1A

The present contrast group carries out the preparation of the anode active material referring to the solution provided in Processing Group 1A, and the difference from Processing Group 1A is that: in Step 1.1 of the preparation of the anode active material in the present contrast group, when preparing the mixed particles, the amount of amorphous carbon to be added is determined according to a mass of graphite particles:a mass of amorphous carbon=1:9, and the mixed particles are obtained consequently. Except for the above differences, the materials and process operations adopted in the present Contrast Group are strictly the same as those in Processing Group 1A.

Contrast Group 2A

The present contrast group carries out the preparation of the anode active material referring to the solution provided in Processing Group 1A, and the difference from Processing Group 1A is that: in Step 1.1 of the preparation of the anode active material in the present contrast group, when preparing the mixed particles, the amount of amorphous carbon to be added is determined according to a mass of graphite particles: a mass of amorphous carbon=5:5, and the mixed particles are obtained consequently. Except for the above differences, the materials and process operations adopted in the present Contrast Group are strictly the same as those in Processing Group 1A.

Contrast Group 3A

The present contrast group carries out the preparation of the anode active material referring to the solution provided in Processing Group 1A, and the difference from Processing Group 1A is that: in the process of preparing the anode active material in the present contrast group, Step 3 is omitted, and the precursor obtained after finishing Step 2 is used directly as the anode active material in the present contrast group. Except for the above differences, the materials and process operations adopted in the present Contrast Group are strictly the same as those in Processing Group 1A.

Contrast Group 4A

The present contrast group carries out the preparation of the anode active material referring to the solution provided in Processing Group 1A, and the difference from Processing Group 1A is that: the present contrast group adjusts the temperature for heating the precursor to 1800° C. in step 3 of the preparation of the anode active material. Except for the above differences, the materials and process operations adopted in the present Contrast Group are strictly the same as those in Processing Group 1A.

Contrast Group 5A

The present contrast group carries out the preparation of the anode active material referring to the solution provided in Processing Group 1A, and the difference from Processing Group 1A is that: in the process of preparing the anode active material in the present contrast group, omitting the addition of sodium tetraborate in Step 1.3. Except for the above differences, the materials and process operations adopted in the present Contrast Group are strictly the same as those in Processing Group 1A.

Blank Control Group

1. Graphite particles are used as the anode active material.

2. Preparation of Pouch Cells

Pouch cells are prepared according to the following method by adopting the anode active materials provided by each processing group, each contrast group, and the blank control group of the present example, respectively:

The anode active material is mixed with sodium carboxymethyl cellulose (CMC), acetylene black, styrene-butadiene rubber (SBR), and carbon nanotubes (CNT) according to a mass ratio of anode active material:CMC:acetylene black:SBR:CNT=6:1:1:1:1:1. The mixture obtained therefrom is mixed with an appropriate amount of N-Methyl-2-pyrrolidone (NMP) solvent to prepare a negative electrode slurry, and then the negative electrode slurry is uniformly coated on a copper foil with a thickness of 4.5 μm. Subsequently, the copper foil is dried in a vacuum drying oven at 80~120° C. for a whole night, and the dried copper foil is sliced using a slicer to prepare 59 mm*45 mm negative electrode sheets.

The positive electrode sheet, electrolyte and separator used in each pouch cell are kept consistent as follows. A carbon coated aluminum foil with a thickness of 12 μm and provided with a cathode active coating was used as the positive electrode sheet. Ethylene carbonate (EC), dimethyl carbonate (DMC), and ethyl methyl carbonate (EMC) are mixed according to a mass ratio of EC:DMC:EMC=3:5:2 to obtain a mixed organic solvent, and then $LiPF_6$ is added to the mixed organic solvent, thereby preparing an electrolyte, in which the content of $LiPF_6$ in the electrolyte is 1 mol/L. A polyethylene film with a thickness of 11 μm is used as the separator.

In a vacuum glove box filled with argon gas, a 1.65 Ah aluminum-plastic film pouch cell is assembled with the negative electrode sheet, positive electrode sheet, separator, and electrolyte as mentioned above.

Testing Example 1

1. Testing Object

The pouch cells prepared in Example 1 are used as the testing object.

2. Testing Items (1) Cycling Performance Test at a Room Temperature

Under a testing environment of 25° C., the testing object is charged to 4.25V at constant current and constant voltage with 1C current, and shelved for 10 min. Then the testing object is discharged to 2.5V at constant current with 1C current, and the charging and discharging process is cycled for 500 cycles, and the Capacity Retention Rate $C_1$% after cycling at a room temperature of the testing object is calculated after 500 cycles.

(2) Storage Performance Test at a High Temperature

The testing object is charged to 4.25V with constant voltage and constant current with 1C current at 25° C., and shelved for 1 h; the testing object is discharged to 2.5V with 1C rate and the released capacity $C_2$ is recorded; the testing object is charged to 4.25V with 1C constant current and constant voltage and shelved for 14 days under storage conditions at 45° C.; the testing object is then discharged to 2.5V with 1C constant current at 25° C. to record the discharged capacity $C_3$; and Capacity Retention Rate after storage at a high temperature of the testing object=$C_3/C_2$.

The battery as a testing object is subjected to the following test operations at 25° C.: $\hat{1}$ shelved for 5 minutes; $\hat{2}$ discharged to 2.5V at a current of 0.5C; $\hat{3}$ shelved for 5 minutes; $\hat{4}$ charged to 4.25V at constant current and constant voltage with 1C current and a cut-off current of 0.05C; $\hat{5}$ shelved for 60 minutes; $\hat{6}$ discharged to 50% State of Charge (SOC) at a constant current of 1C, and shelved for 0.5 h; $\hat{7}$ discharged with a constant current of I=2C for 10 seconds, the voltage $U_1$ is recorded at the beginning of the discharging, and the voltage $U_2$ at the end of the discharging; the Direct Current Internal Resistance (DCIR) of the testing object is calculated according to DCIR=$(U_1-U_2)/I$, which is recorded as $DCIR_0$. The testing object is shelved for 14 days under storage conditions at 45° C., and the DCIR value of the testing object is tested in the same way as mentioned above and is recorded as $DCIR_1$. Calculating the Resistance Change Rate DCIR %=$(DCIR_1-DCIR_0)/DCIR_0$ and calculating the Resistance Change Rate DCIR % at a high temperature for each testing object.

3. Testing Results

The testing results of the present Testing Example are shown as Table 1.

In the present application, amorphous carbon is utilized to form a coating layer on the surface of synthetic graphite, which may not only modify the surface of graphite particles, reduce the performance defects of graphite particles, but also act as a protection layer on the surface of graphite particles, thereby effectively reducing the irreversible erosion of the graphite particles by the electrolyte.

In the process of preparing the anode active materials in the Processing Group 1A, the Processing Group 2A, the Processing Group 3A, the Contrast Group 1A, and the Contrast Group 2A of Example 1 respectively, the difference is the ratio between the amorphous carbon and the synthetic graphite included in the raw materials. As seen from the testing results, among the anode active materials provided in the above mentioned groups, the (room-temperature/high-temperature) Capacity Retention Rate measured corresponding to the Contrast Group 1A and the Contrast Group 2A is relatively low while the high-temperature Resistance Change Rate is relatively high, which is due to the fact that the amount of synthetic graphite in the raw material used by the Contrast Group 1A is relatively low, whereas the amount of amorphous carbon in the raw material used by the Contrast Group 2A is relatively low.

In the process of preparing the anode active material, the amorphous carbon is spray-dried to form a coating layer on the surface of the synthetic graphite, which improves the distribution uniformity of the amorphous carbon on the surface of the synthetic graphite, and is conducive to the formation of a coating layer on the surface of the synthetic graphite with a good quality of the film. After the amorphous carbon is fed, the precursor formed therefrom also requires a heating process. In order to investigate the influence of the heating process on the performance of the anode active materials, in Example 1, Processing Group 1A, Processing Group 4A, Processing Group 5A, Contrast Group 3A, and Comparison Group 4A are set up. The anode active materials prepared by the above groups are compared with the anode active materials provided by the blank control group; however, the Capacity Retention Rate of the anode active materials prepared in Contrast Group 3A by omitting the heating process of the precursor, and the anode active materials prepared in Contrast Group 4A by heating the precursor at a relatively low temperature are not significantly improved as compared with the anode active materials without amorphous carbon coating provided in the blank control group, and the Resistance Change Rate at a high temperature reaches even a higher level. In the process of preparing anode active materials in Processing Group 1A, Processing Group 4A, and Processing Group 5A, after finishing the amorphous carbon coating of graphite particles by spray-drying, the precursors formed therefrom are subjected to heating process at 2000~3000° C., and the Capacity Retention Rate of the prepared anode active materials is improved to a certain extent, and the Resistance Change Rate at a high temperature is significantly decreased compared with that of the anode active materials prepared in the blank control group that are not subjected to an amorphous carbon coating.

Furthermore, the Contrast Group 5A provided in Example 1 contains no sodium tetraborate in the process of preparing the anode active material. Compared with the anode active material prepared therefrom, the Capacity Retention Rate after storage at a room temperature/high temperature of the anode active material prepared in the Processing Group 1A is significantly improved, and the Resistance Change Rate at a high temperature is significantly decreased. The reason is that, in the process of preparing the anode active material in Processing Group 1A, the prepared precursor includes sodium tetraborate and graphite particles. During the subsequent heating process of the precursor, sodium tetraborate may infiltrate into the graphite material and transform into high-temperature antioxidant substance, filling the internal gaps of the graphite material and covering the graphite surface, which may play a role in isolating oxidizing gases and blocking gases from entering into the interior of the graphite material from the gaps, slowing down the occurrence of oxidizing reaction, improving the high-temperature antioxidant performance of the graphite material, which improves the capacity retention rate of the anode active material, and improves the high-temperature working stability.

TABLE 1

Testing Result Statistics of Testing Example 1

| Testing Object | Capacity Retention Rate $C_1$ % after cycling at a room temperature | Capacity Retention Rate $C_3/C_2$ % after storage at a high temperature | Resistance Change Rate DCIR % at a high temperature |
|---|---|---|---|
| Processing Group 1A | 97.5 | 99.0 | 1.0 |
| Processing Group 2A | 96.1 | 98.3 | 2.0 |
| Processing Group 3A | 95.5 | 98.0 | 2.5 |
| Processing Group 4A | 96.8 | 98.1 | 1.8 |
| Processing Group 5A | 96.1 | 97.4 | 2.8 |
| Contrast Group 1A | 95.3 | 97.2 | 3.4 |
| Contrast Group 2A | 94.6 | 96.8 | 3.8 |
| Contrast Group 3A | 92.0 | 94.8 | 8.0 |
| Contrast Group 4A | 93.8 | 96.3 | 5.4 |
| Contrast Group 5A | 94.6 | 96.8 | 4.7 |
| Blank Control Group | 93.2 | 96.0 | 5.2 |

Example 2

1. Preparation of the Anode Active Material

The graphite particles adopted in the present example are synthetic graphite. In the present example, Processing Group 1B, Processing Group 2B, Processing Group 3B, Contrast Group 1B and Contrast Group 2B are set up according to the different processes for preparing the anode active material, and a blank control group is set up with the graphite particles used for the preparation of the anode active material of each Processing Group and Contrast Group, and the graphite particles are directly used as the anode active material in the blank control group.

Processing Group 1B

The present processing group carries out the preparation of the anode active material according to the solution provided in Processing Group 1A of Example 1, and all materials used in the present processing group and all process operations are strictly the same as those in Processing Group 1A of Example 1.

Processing Group 2B

The present processing group carries out the preparation of the anode active material referring to the solution provided in Processing Group 1B, and the difference from Processing Group 1B is that: the present processing group adjusts the temperature of the spray-drying to 120° C. in step 2 of the preparation of the anode active material. Except for the above differences, the materials and process operations adopted in the present Processing Group are strictly the same as those in Processing Group 1B.

Processing Group 3B

The present processing group carries out the preparation of the anode active material referring to the solution provided in Processing Group 1B, and the difference from Processing Group 1B is that: the present processing group adjusts the temperature of the spray-drying to 240° C. in step 2 of the preparation of the anode active material. Except for the above differences, the materials and process operations adopted in the present Processing Group are strictly the same as those in Processing Group 1B.

Contrast Group 1B

The present contrast group carries out the preparation of the anode active material referring to the solution provided in Processing Group 1B, and the difference from Processing Group 1B is that: the present contrast group adjusts the temperature of the spray-drying to 280° C. in step 2 of the preparation of the anode active material. Except for the above differences, the materials and process operations adopted in the present Contrast Group are strictly the same as those in Processing Group 1B.

Contrast Group 2B

The present contrast group carries out the preparation of the anode active material referring to the solution provided in Processing Group 1B, and the difference from Processing Group 1B is that: in the process of preparing the anode active material in the present contrast group, omitting the process involving spray-drying in step 2; the citric acid and the mixed particles are mixed in an amount in step 1.4; the obtained mixture is used as a precursor directly into step 3; and the precursor is subjected to a heating process in step 3. Except for the above differences, the materials and process operations adopted in the present Contrast Group are strictly the same as those in Processing Group 1B.

Blank Control Group

1. Graphite particles are used as the anode active material.

2. Preparation of Pouch Cells

Pouch cells are prepared according to the method for preparing pouch cells in Example 1 and are prepared by adopting the anode active materials provided in each processing group, each contrast group, and the blank control group of the present example respectively, which is not repeated herein.

Testing Example 2

1. Testing Object

The pouch cells prepared in the Example 2 are used as the testing object.

2. Testing Items (1) Cycling Performance Test at a Room Temperature

The testing object of the present testing example is tested according to the testing method for the Capacity Retention Rate $C_1$% after cycling at a room temperature provided in Testing Example 1, and the specific operation is as documented in Testing Example 1, which is not repeated herein.

(2) Storage Performance Test at a High Temperature

The testing object of the present testing example is tested according to the testing method for the Capacity Retention Rate $C_2$% after storage at a high temperature and the Resistance Change Rate DCIR % at a high temperature provided in Testing Example 1, and the specific operation is as documented in Testing Example 1, which is not repeated herein.

3. Testing Results

In the process of preparing the anode active material in the processing group and the contrast group set up in Example 2, the difference is that the spray-drying process operation for achieving the attachment of amorphous carbon to the surface of the synthetic graphite. Processing Group 1B, Processing Group 2B, Processing Group 3B, Comparison Group 1B, and Comparison Group 2B all introduce amorphous carbon to coat the synthetic graphite in the process of preparing the anode active materials. As shown by the testing results in Table 2, although the anode active materials prepared by these groups obtain a certain improvement in the Capacity Retention Rate after cycling at a room temperature, the Capacity Retention Rate after storage at a high temperature, and a decrease in the Resistance Change Rate at a high temperature in comparison with the anode active materials prepared in the blank control group. However, compared with the anode active materials prepared by Processing Group 1B, Processing Group 2B, and Processing Group 3B, the Capacity Retention Rate after cycling at a room temperature and the Capacity Retention Rate after storage at a high temperature of the anode active materials prepared in Contrast Group 1B and Contrast Group 2B are at a low level, and the Resistance Change Rate after storage at a high temperature is also significantly large. It is shown that the spray-drying process and the processing temperature thereof are important influencing factors for the electrical properties of the anode active materials provided by the present application.

TABLE 2

Testing Result Statistics of Testing Example 2

| Testing Object | Capacity Retention Rate $C_1$ % after cycling at a room temperature | Capacity Retention Rate $C_3$/ $C_2$ % after storage at a high temperature | Resistance Change Rate DCIR % at a high temperature |
|---|---|---|---|
| Processing Group 1B | 97.5 | 99.0 | 1.0 |
| Processing Group 2B | 97.0 | 97.2 | 2.8 |
| Processing Group 3B | 95.6 | 96.3 | 3.1 |
| Contrast Group 1B | 94.2 | 95.8 | 4.8 |
| Contrast Group 2B | 95.0 | 95.1 | 5.0 |
| Blank Control Group | 93.2 | 96.0 | 5.2 |

Example 3

1. Preparation of the Anode Active Material

The graphite particles adopted in the present example is synthetic graphite. In the present example, Processing Group 1C, Processing Group 2C, and Processing Group 3C are set up according to the different processes for preparing the anode active material, and a blank control group is set up with the graphite particles used for the preparation of the anode active material of each Processing Group and Contrast Group, and the graphite particles are directly used as the anode active material in the blank control group.

Processing Group 1C

The present processing group carries out the preparation of the anode active material according to the solution provided in Processing Group 1A of Example 1, and all materials used in the present processing group and all process operations are strictly the same as those in Processing Group 1A of Example 1.

Processing Group 2C

The present processing group carries out the preparation of the anode active material referring to the solution provided in Processing Group 1C, and the difference from Processing Group 1C is that: in Step 1.1 of the preparation of the anode active material in the present processing group, omitting the operation of preparing a mixture by mixing amorphous carbon with deionized water and ball grinding the mixture, so that the amorphous carbon obtained after finishing the pyrolytic deposition reaction in Step 1.1 is directly put into the process of Step 1.3 without the ball grinding. Except for the above differences, the materials and process operations adopted in the present Processing Group are strictly the same as those in Processing Group 1C.

Processing Group 3C

The present processing group carries out the preparation of the anode active material referring to the solution provided in Processing Group 1C, and the difference from Processing Group 1C is that: in Step 2 of the preparation of the anode active material in the present processing group, omitting the operation of grinding the precursor, so that the precursor obtained after finishing spray-drying in Step 2 is directly processed in Step 3 without grinding. Except for the above differences, the materials and process operations adopted in the present Processing Group are strictly the same as those in Processing Group 1C.

Blank Control Group

1. Graphite Particles are Used as the Anode Active Material.

2. Preparation of Pouch Cells

Pouch cells are prepared according to the method for preparing pouch cells in Example 1 and are prepared by adopting the anode active materials provided in each processing group, each contrast group, and the blank control group of the present example respectively, which is not repeated herein.

Testing Example 3

1. Testing Object

The pouch cells prepared in the Example 3 are used as the testing object.

2. Testing Items (1) Cycling Performance Test at a Room Temperature

The testing object of the present testing example is tested according to the testing method for the Capacity Retention Rate $C_1$% after cycling at a room temperature provided in Testing Example 1, and the specific operation is as documented in Testing Example 1, which is not repeated herein.

(2) Storage Performance Test at a High Temperature

The testing object of the present testing example is tested according to the testing method for the Capacity Retention Rate $C_2$% after storage at a high temperature provided in Testing Example 1, and the specific operation is as documented in Testing Example 1, which is not repeated herein.

3. Testing Results

In the process of preparing anode active materials, the coating uniformity and diameter distribution of the anode active materials influence the performance of the anode active materials. In the processing group provided in Example 3, in the process of preparing the anode active material in Processing Group 1C, the precursors obtained after spray-drying of the amorphous carbon are ground, thereby achieving regulation of the diameter of the particles, so that the anode active material prepared therefrom performs an optimal comprehensive performance. However, ball grinding of amorphous carbon is omitted in the process of preparing the anode active material in Processing Group 2C, and the grinding step of the precursor is omitted in the process of preparing the anode active material in Processing Group 3C, so that the anode active material prepared therefrom provides a lower Capacity Retention Rate after cycling at a room temperature, a lower Capacity Retention Rate after storage at a high temperature, and a higher Resistance Change Rate at a high temperature, as compared with that of the anode active material prepared in Processing Group 1C.

TABLE 3

Testing Result Statistics of Testing Example 3

| Testing Object | Capacity Retention Rate $C_1$ % after cycling at a room temperature | Capacity Retention Rate $C_3$/$C_2$ % after storage at a high temperature | Resistance Change Rate DCIR % at a high temperature |
|---|---|---|---|
| Processing Group 1C | 97.5 | 99.0 | 1.0 |
| Processing Group 2C | 94.3 | 96.2 | 3.3 |
| Processing Group 3C | 96.2 | 97.3 | 2.3 |
| Blank Control Group | 93.2 | 96.0 | 5.2 |

The above examples are only used to illustrate the technical solution of the present application rather than to limit the scope of protection of the present application. Although the present application has been described in detail with reference to the preferred examples, a person of ordinary skill in the art should understand that the technical solution of the present application may be modified or equivalently replaced without departing from the essence and scope of the technical solution of the present application.

The invention claimed is:

1. An anode active material, wherein a preparation method of the anode active material comprises steps as follows:

in step 1, mixing graphite particles, sodium tetraborate and amorphous carbon, pulping with mixed particles prepared therefrom, thereby obtaining a mixed slurry, wherein a feeding amount of materials mentioned above meets as follows: a mass of the graphite particles:a mass of the amorphous carbon=2~4:6~8, a mass of the sodium tetraborate:a mass of the graphite particles=0.07~0.12:1, and the graphite particles comprise synthetic graphite;

in step 2, spray-drying the mixed slurry, wherein solid particles obtained therefrom are used as a precursor; and in step 3, heating the precursor for 18~34 hours at 2000~3000° C. so as to prepare and obtain the anode active material.

2. The anode active material according to claim 1, wherein in step 1, the mixed slurry is prepared by mixing the mixed particles with citric acid and slurry dispersant, and a feeding amount of the citric acid meets as follows, a mass of the citric acid:a mass of the mixed particles=0.02~0.05:1.

3. The anode active material according to claim 2, wherein a temperature of the spray-drying in step 2 is 120~240° C.

4. The anode active material according to claim 1, wherein in step 1, a diameter $D_{25}$ of the graphite particles is 1.5~3.5 μm, and a diameter $D_{25}$ of the amorphous carbon is ≤1 μm.

5. The anode active material according to claim 1, wherein before preparing the mixed particles by utilizing the graphite particles, performing a high-temperature process on the graphite particles, the high-temperature process is performed at a processing temperature of 2000~3000° C.

6. The anode active material according to claim 1, wherein preparation of the amorphous carbon comprises steps as follows: a carbon source used to prepare the amorphous carbon is subjected to a pyrolysis deposition reaction to obtain the amorphous carbon; during the pyrolysis deposition reaction, a pyrolysis temperature is 1350~1700° C., and a pyrolysis pressure is 1 kPa~4 kPa.

7. The anode active material according to claim 6, wherein the carbon source comprises diacetylene.

8. The anode active material according to claim 1, wherein a diameter of the anode active material falls within a range of 1~30 μm.

9. The anode active material according to claim 8, wherein a diameter distribution of the anode active material satisfies: $D_{10}$=15~18 μm, $D_{50}$=20~25 μm, $D_{90}$=28~32 μm.

10. The anode active material according to claim 1, wherein a temperature of the spray-drying in step 2 is 120~240° C.

11. A lithium-ion battery comprises a negative electrode, the negative electrode comprising an anode active material, wherein a preparation method of the anode active material comprises steps as follows:

in step 1, mixing graphite particles, sodium tetraborate and amorphous carbon, pulping with mixed particles prepared therefrom, thereby obtaining a mixed slurry, wherein a feeding amount of materials mentioned above meets as follows: a mass of the graphite particles:a mass of the amorphous carbon=2~4:6~8, a mass of the sodium tetraborate:a mass of the graphite particles=0.07~0.12:1, and the graphite particles comprise synthetic graphite;

in step 2, spray-drying the mixed slurry, wherein solid particles obtained therefrom are used as a precursor; and in step 3, heating the precursor for 18~34 hours at 2000~3000° C. so as to prepare and obtain the anode active material.

12. The lithium-ion battery according to claim 11, wherein in step 1, the mixed slurry is prepared by mixing the mixed particles with citric acid and slurry dispersant, and a feeding amount of the citric acid meets as follows, a mass of the citric acid: a mass of the mixed particles=0.02~0.05:1.

13. The lithium-ion battery according to claim 12, wherein a temperature of the spray-drying in step 2 is 120~240° C.

14. The lithium-ion battery according to claim 11, wherein in step 1, a diameter $D_{25}$ of the graphite particles is 1.5~3.5 μm, and a diameter $D_{25}$ of the amorphous carbon is ≤1 μm.

15. The lithium-ion battery according to claim 11, wherein before preparing the mixed particles by utilizing the graphite particles, performing a high-temperature process on the graphite particles, the high-temperature process is performed at a processing temperature of 2000~3000° C.

16. The lithium-ion battery according to claim 11, wherein preparation of the amorphous carbon comprises steps as follows: a carbon source used to prepare the amorphous carbon is subjected to a pyrolysis deposition reaction to obtain the amorphous carbon; during the pyrolysis deposition reaction, a pyrolysis temperature is 1350~1700° C., and a pyrolysis pressure is 1 kPa'~4 kPa.

17. The lithium-ion battery according to claim 16, wherein the carbon source comprises diacetylene.

18. The lithium-ion battery according to claim 11, wherein a diameter of the anode active material falls within a range of 1~30 μm.

19. The lithium-ion battery according to claim 18, wherein a diameter distribution of the anode active material satisfies: $D_{10}$=15~18 μm, $D_{50}$=20~25 μm, $D_{90}$=28~32 μm.

20. The lithium-ion battery according to claim 11, wherein a temperature of the spray-drying in step 2 is 120~240° C.

* * * * *